United States Patent
Onofrio et al.

(10) Patent No.: US 11,604,248 B1
(45) Date of Patent: Mar. 14, 2023

(54) LOW POWER GUNSHOT SENSOR TESTING

(71) Applicant: Shooter Detection Systems, LLC, Newburyport, MA (US)

(72) Inventors: Richard Thomas Onofrio, Arlington, MA (US); Ronald A Fowler, Westford, MA (US)

(73) Assignee: Shooter Detection Systems, LLC, Newburyport, MA (US)

( * ) Notice: Subject to any disclaimer, the term of this patent is extended or adjusted under 35 U.S.C. 154(b) by 349 days.

(21) Appl. No.: 17/060,134

(22) Filed: Oct. 1, 2020

Related U.S. Application Data

(63) Continuation-in-part of application No. 15/797,659, filed on Oct. 30, 2017, now Pat. No. 10,830,866, which is a continuation-in-part of application No. 15/684,925, filed on Aug. 23, 2017, now Pat. No. 10,657,800, which is a continuation-in-part of application No. 15/613,161, filed on Jun. 3, 2017, now abandoned, which is a continuation-in-part of application No. 15/498,283, filed on Apr. 26, 2017, now Pat. No. 10,586,109.

(60) Provisional application No. 62/429,754, filed on Dec. 3, 2016, provisional application No. 62/415,009, filed on Oct. 31, 2016, provisional application No. 62/379,023, filed on Aug. 24, 2016, provisional application No. 62/345,465, filed on Jun. 3, 2016, provisional application No. 62/327,552, filed on Apr. 26, 2016.

(51) Int. Cl.
*G01S 5/18* (2006.01)

(52) U.S. Cl.
CPC ..................... *G01S 5/18* (2013.01)

(58) Field of Classification Search
CPC ........................................... G01S 5/18
USPC ........................................... 348/143
See application file for complete search history.

(56) References Cited

U.S. PATENT DOCUMENTS

| 5,930,202 A | 7/1999 | Duckworth et al. |
| 6,178,141 B1 | 1/2001 | Duckworth et al. |
| (Continued) | | |

FOREIGN PATENT DOCUMENTS

| WO | WO0073811 A1 | 12/2000 |
| WO | WO2009046367 A1 | 4/2009 |
| (Continued) | | |

OTHER PUBLICATIONS

Sonzalez-Castano, Francisco Javier, et al. "Acoustic sensor planning for gunshot location in national parks: A pareto front approach." Sensors 9.12 (2009): 9493-9512.

*Primary Examiner* — Nguyen T Truong
(74) *Attorney, Agent, or Firm* — Adams Intellex, PLC

(57) ABSTRACT

Techniques for low power gunshot sensor testing are disclosed. An acoustic generator and an infrared generator are disposed in a housing. The housing encompasses the acoustic generator and the infrared generator. The housing covers the gunshot sensor. The acoustic generator and the infrared generator are used for testing a gunshot sensor. The infrared generator and the acoustic generator are coupled to an activation circuit. A switch is coupled to the acoustic generator and the infrared generator. The switch provides activation control of the acoustic generator and the infrared generator. The infrared generator includes a light source operating in the near-infrared (NIR) band. The light source operating in the NIR band provides testing for a gunshot muzzle flash sensor. The infrared generator includes a light source operating in the mid-infrared (MIR) band. The light source operating in the MIR band provides testing for a passive infrared (PIR) sensor.

26 Claims, 11 Drawing Sheets

(56) References Cited

U.S. PATENT DOCUMENTS

| | | | |
|---|---|---|---|
| 6,847,587 B2 | 1/2005 | Patterson et al. |
| 7,203,132 B2 | 4/2007 | Berger |
| 7,266,045 B2 | 9/2007 | Baxter et al. |
| 7,411,865 B2 | 8/2008 | Calhoun |
| 7,474,589 B2 | 1/2009 | Showen et al. |
| 7,532,542 B2 | 5/2009 | Baxter et al. |
| 7,586,812 B2 | 9/2009 | Baxter et al. |
| 7,599,252 B2 | 10/2009 | Showen et al. |
| 7,602,329 B2 | 10/2009 | Manderville et al. |
| 7,688,679 B2 | 3/2010 | Baxter et al. |
| 7,710,278 B2 | 5/2010 | Holmes et al. |
| 7,719,428 B2 | 5/2010 | Fisher et al. |
| 7,750,814 B2 | 7/2010 | Fisher et al. |
| 7,751,282 B2 | 7/2010 | Holmes et al. |
| 7,755,495 B2 | 7/2010 | Baxter et al. |
| 7,796,470 B1 | 9/2010 | Lauder et al. |
| 7,855,935 B1 | 12/2010 | Lauder et al. |
| 7,961,550 B2 | 6/2011 | Calhoun |
| 8,036,065 B2 | 10/2011 | Baxter et al. |
| 8,063,773 B2 | 11/2011 | Fisher et al. |
| 8,134,889 B1 | 3/2012 | Showen et al. |
| 8,325,562 B2 | 12/2012 | Showen |
| 8,325,563 B2 | 12/2012 | Calhoun et al. |
| 8,351,297 B2 | 1/2013 | Lauder et al. |
| 8,369,184 B2 | 2/2013 | Calhoun |
| 8,478,319 B2 | 7/2013 | Azimi-Sadjadi et al. |
| 8,995,227 B1 | 3/2015 | Johnson |
| 9,240,114 B2 | 1/2016 | Showen et al. |
| 2004/0100868 A1 | 5/2004 | Patterson, Jr. et al. |
| 2008/0219100 A1 | 9/2008 | Fisher et al. |
| 2010/0278013 A1 | 11/2010 | Holmes et al. |
| 2012/0300587 A1 | 11/2012 | Azimi-Sadjadi et al. |
| 2014/0361886 A1 | 12/2014 | Cowdry |
| 2015/0070166 A1 | 3/2015 | Boyden et al. |
| 2015/0071038 A1 | 3/2015 | Boyden et al. |
| 2015/0177363 A1 | 6/2015 | Hermann et al. |
| 2015/0268170 A1 | 9/2015 | Scott et al. |
| 2015/0347902 A1 | 12/2015 | Butler, Jr. et al. |
| 2016/0086472 A1 | 3/2016 | Herrera et al. |
| 2016/0133107 A1 | 5/2016 | Showen et al. |
| 2016/0225242 A1 | 8/2016 | Kane et al. |
| 2016/0232774 A1 | 8/2016 | Noland et al. |
| 2016/0260307 A1 | 9/2016 | Skorpik et al. |
| 2017/0123038 A1 | 5/2017 | Griggs et al. |
| 2017/0169686 A1 | 6/2017 | Skorpik et al. |

FOREIGN PATENT DOCUMENTS

| | | |
|---|---|---|
| WO | WO2009048500 A2 | 4/2009 |
| WO | WO2009085361 A2 | 7/2009 |
| WO | WO2010039130 A1 | 4/2010 |
| WO | WO2010085822 A2 | 7/2010 |
| WO | WO2012103153 A2 | 8/2012 |
| WO | WO2014070174 A1 | 5/2014 |
| WO | WO2014165459 A2 | 10/2014 |

LOW POWER GUNSHOT SENSOR TESTING

RELATED APPLICATIONS

This application is a continuation-in-part of U.S. patent application "Testing of Gunshot Sensors" Ser. No. 15/797,659, filed Oct. 30, 2017, which claims the benefit of U.S. provisional patent applications "Testing of Gunshot Sensors" Ser. No. 62/429,754, filed Dec. 3, 2016, and "Gunshot Sensor Testing" Ser. No. 62/415,009, filed Oct. 31, 2016.

The U.S. patent application "Testing of Gunshot Sensors" Ser. No. 15/797,659, filed Oct. 30, 2017 is also a continuation-in-part of U.S. patent application "Gunshot Detection within an Indoor Environment" Ser. No. 15/684,925, filed Aug. 23, 2017, which claims the benefit of U.S. provisional patent applications "Gunshot Detection within an Indoor Environment" Ser. No. 62/379,023, filed Aug. 24, 2016, and "Testing of Gunshot Sensors" Ser. No. 62/429,754, filed Dec. 3, 2016.

The U.S. patent application "Testing of Gunshot Sensors" Ser. No. 15/797,659, filed Oct. 30, 2017 is also a continuation-in-part of U.S. patent application "Indoor Gunshot Detection Analysis with Ongoing Fire Alarm" Ser. No. 15/613,161, filed Jun. 3, 2017, which claims the benefit of U.S. provisional patent applications "Indoor Gunshot Detection Analysis with Ongoing Fire Alarm" Ser. No. 62/345,465, filed Jun. 3, 2016, "Gunshot Detection within an Indoor Environment" Ser. No. 62/379,023, filed Aug. 24, 2016, and "Testing of Gunshot Sensors" Ser. No. 62/429,754, filed Dec. 3, 2016.

The U.S. patent application "Indoor Gunshot Detection Analysis with Ongoing Fire Alarm" Ser. No. 15/613,161, filed Jun. 3, 2017 is also a continuation-in-part of U.S. patent application "Indoor Gunshot Detection with Video Analytics" Ser. No. 15/498,283, filed Apr. 26, 2017, which claims the benefit of U.S. provisional patent applications "Indoor Gunshot Detection with Video Analytics" Ser. No. 62/327,552, filed Apr. 26, 2016, "Indoor Gunshot Detection Analysis with Ongoing Fire Alarm" Ser. No. 62/345,465, filed Jun. 3, 2016, "Gunshot Detection within an Indoor Environment" Ser. No. 62/379,023, filed Aug. 24, 2016, and "Testing of Gunshot Sensors" Ser. No. 62/429,754, filed Dec. 3, 2016.

The U.S. patent application "Testing of Gunshot Sensors" Ser. No. 15/797,659, filed Oct. 30, 2017 is also a continuation-in-part of U.S. patent application "Indoor Gunshot Detection with Video Analytics" Ser. No. 15/498,283, filed Apr. 26, 2017, which claims the benefit of U.S. provisional patent applications "Indoor Gunshot Detection with Video Analytics" Ser. No. 62/327,552, filed Apr. 26, 2016, "Indoor Gunshot Detection Analysis with Ongoing Fire Alarm" Ser. No. 62/345,465, filed Jun. 3, 2016, "Gunshot Detection within an Indoor Environment" Ser. No. 62/379,023, filed Aug. 24, 2016, and "Testing of Gunshot Sensors" Ser. No. 62/429,754, filed Dec. 3, 2016.

Each of the foregoing applications is hereby incorporated by reference in its entirety.

FIELD OF ART

This application relates generally to gunshot detection and more particularly to low power gunshot sensor testing.

BACKGROUND

Gun violence has unfortunately occurred in a variety of public places, such as schools, places of worship, sporting event venues, nightclubs, and airports. While the use of metal detectors and other security measures are frequently employed in an attempt to prevent people with firearms from entering such venues, incidents of gun violence in public continue to be a major issue. If a gunshot occurs, gunshot detection by electronic devices, rather than by humans, is desirable for a variety of purposes and applications that include the military, law enforcement, security, and public safety. However, gunshot detection is a complex task for many reasons, including the sheer variety of weapons and explosive devices that can produce the gunshot event. Identifying the point of origin of the gunshot is critical to identifying and tracking a suspected shooter. The identification of the source of the gunshot is complicated by many factors such as the spatial environment in which the gunshot event occurs. Gunshot detection and shooter identification are critical elements in many military, law enforcement, security, and public safety scenarios.

Some early work in detecting gunshots in an outdoor setting involved installing several microphones which would be spread out over a large distance. A gunshot is often so loud that it can be heard many thousands of feet away in an outdoor setting. The occurrence of a gunshot would then register on the microphones, but at slightly different times. Because the speed of sound in dry air at sea level at 68° Fahrenheit is about 1125 feet/second, a gunshot occurring at a location somewhere between two microphones that are 2500 feet apart would be detected at the microphones one or even two seconds apart, which is an easily detectable difference. Furthermore, the relative times of detection are an indication of the proximity of the gunshot to one microphone versus another microphone. Unfortunately, this scheme cannot distinguish between gunshots and other similar explosive sounds, such as car backfires, construction noises, fireworks, etc.

The problem of gunshot detection indoors is many times more complicated than gunshot detection outdoors. In indoor settings, many complicating factors intrude upon accurate gunshot detection. For example, in an indoor setting, the probability of extensive sound reverberations and echoes from the initial gunshot is very high. In addition, rooms within the indoor setting often have convoluted acoustic pathways. These acoustic pathways are often blocked by closed doors, which cause many decibels of sound attenuation. Furthermore, indoor settings are often spread over multiple floors and are replete with crowds of people, which makes dealing with indoor gunshots extremely challenging for law enforcement officers or other public safety personnel. Additionally, many other distracting sonic and visual interferences may be present in a crowded, indoor environment, including screams, flashlights, police alarms, building alarms, fire alarms, earthquake alarms, tornado alarms, and the like. Gunshot detection in an indoor environment is an important element of public safety.

Local, state, or federal governments and agencies, as well as private organizations such as businesses, depend upon the ability to quickly detect gunshots to keep the public safe. The ability to detect the sound of gunshots is critical for military defense, law enforcement, public and private security, and public safety, to name only a few of the many applications. Gunshot detection permits security personnel in a variety of organizations to deploy resources to protect lives and property by reacting and responding quickly and appropriately to the given event.

SUMMARY

Gunshot detection, whether outdoor or indoor, is critical to many applications, such as public safety, law enforcement, defense, and security. While the motivations for gunshot detection vary, the objectives consistently remain the same: to quickly identify and respond to a gunshot event. Scientifically speaking, a gunshot event produces signals that include both optical components and acoustic components. The optical components, namely infrared (IR) and visible light signals, result from the muzzle flash. The muzzle flash occurs when the combusting gases that expel the projectile from the firearm escape from the muzzle of the firearm. The acoustic components result from the muzzle blast expelling the projectile and any shock wave from a projectile traveling at supersonic velocities. Indoor gunshot detection is based on detecting both an infrared pulse and an acoustic impulse that result from discharging a firearm within an enclosed space. Indoor gunshot detection is used for determining that a gunshot or gunshots have occurred and for initiating plans to respond to the gunshots. Gunshot response plans can include identifying and locating criminals and combatants, assigning rapid response resources, and so on.

In order to provide accurate detection, it is important for the gunshot sensors to be properly operational. Testing for proper operation is a critical part of certifying and maintaining a gunshot detection system. However, it is obvious that testing a gunshot detection system by actually firing a gun is not a viable option in many, if not most, situations and/or venues. Therefore, a quick, discrete, non-alarming gunshot detection testing approach is greatly needed. Disclosed techniques and devices provide for convenient, in-situ testing of gunshot sensors.

An apparatus for sensor evaluation is disclosed comprising: an acoustic generator used for testing a gunshot sensor; an infrared generator used for testing the gunshot sensor, wherein the infrared generator and the acoustic generator are coupled to an activation circuit; a housing encompassing the acoustic generator and the infrared generator, wherein the housing covers the gunshot sensor; and a switch coupled to the acoustic generator and the infrared generator, wherein the switch provides activation control of the acoustic generator and the infrared generator. In embodiments, the infrared generator comprises a light source operating in the near-infrared (NIR) band. In embodiments, the light source operating in the NIR band provides testing for a gunshot muzzle flash sensor included in the gunshot sensor. Some embodiments comprise a light source operating in the mid-infrared (MIR) band included in the infrared generator. In embodiments, the light source operating in the MIR band provides testing for a passive infrared (PIR) sensor included in the gunshot sensor. And in embodiments, the light source operating in the MIR band provides testing for a motion detector included in the gunshot sensor.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
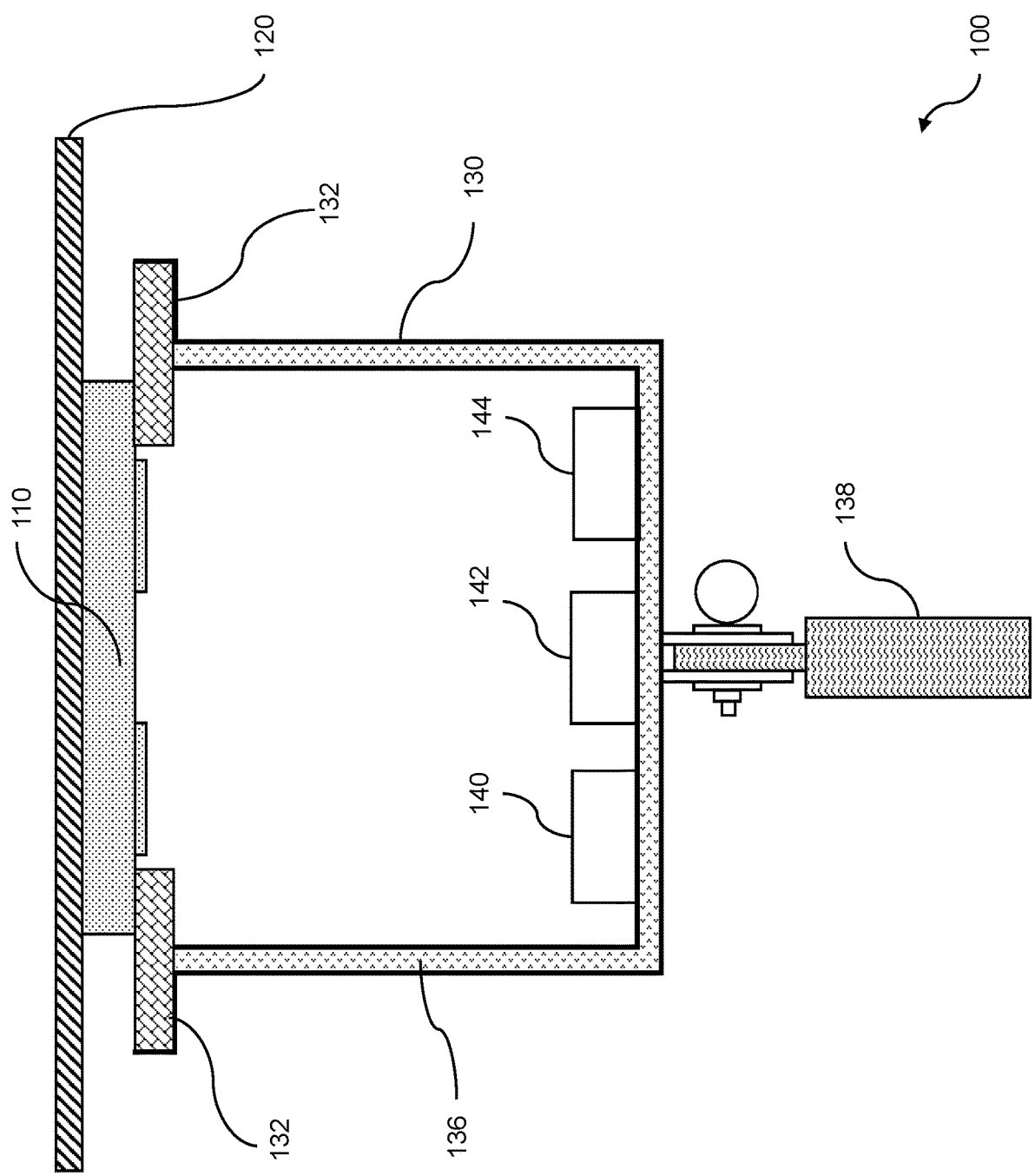
FIG. 1 is a diagram of a cross section of a gunshot sensor tester.

According to recent statistics, over three hundred people in America are shot daily in murders, assaults, suicide attempts, unintentional shootings, and law enforcement intervention. Every day, on average, there are ninety fatalities from gun violence. Thus, gunshot detection has become an important safety feature in various venues, such as schools, office buildings, airports, hospitals, and gymnasiums, to name a few. Such systems can quickly alert authorities to possible gunshots, allowing police and/or security teams to be dispatched. Additionally, the gunshot detection systems can be used to initiate a lockdown sequence (e.g. at a school) where occupants move to safer areas to reduce the risk of injury from gunfire. Therefore, it is of paramount importance to ensure that the gunshot detection system is working properly.

As with any type of sensor, the gunshot detection system can only be effective if the gunshot sensors are in working order. It is therefore desirable to perform periodic testing of the gunshot sensors to ensure proper operation. A gunshot sensor can be a complex instrument that includes acoustic sensors, infrared sensors, microphones, and pressure sensors, among other components. In some cases, gunshot sensors can operate in multiple power consumption modes, which therefore can necessitate testing the gunshot sensor according to those power modes. For example, a sensor operating in a low power "sleep" mode must first be "awakened" out of the low power mode before regular testing can be commenced. Furthermore, testing the sensors can require multiple stimuli, such as acoustic stimuli and infrared stimuli. In some cases, gunshot sensors have been tested by firing test firearms with blank rounds or by another method to generate the sounds and infrared light associated with a weapon discharge. However, it often is not practical to perform this testing, as it can be quite disruptive to the occupants of the premises. For example, creating such loud noises in a school or library could be disruptive and unacceptable for the occupants.

A typical firearm discharge involves various phenomena. There is a muzzle flash, which emits visible and infrared light. A muzzle flash typically is comprised of multiple phases, which include a primary flash, an intermediate flash, and a secondary flash. The primary flash results as hot, highly compressed gases, which are the unburned propellants, escape from the barrel along with the projectile. These gases expand rapidly, not mixing with the atmosphere, then rebound. This creates a high-temperature region that produces the intermediate flash. As oxygen mixes with the unburned propellants, ignition occurs, causing the secondary flash. A majority of the radiated energy corresponding to the muzzle flash occurs during the secondary flash, and most of the total radiated energy is in the infrared (IR) region. This is in contrast to other environmental factors within an indoor environment, such as fire alarm strobes. Unlike the light emitted from a fire alarm strobe which is mostly in the visible spectrum, the light emitted from a muzzle flash has a much higher IR component. Thus, detecting IR energy is an important aspect of gunshot detection.

A shock wave can also occur, which is caused by the supersonic travel of the projectile/bullet. A supersonic bullet causes a distinctive shock wave pattern as it moves through the air. The shock wave expands as a cone behind the bullet, with the wave front propagating outward at the speed of sound. As the shock wave propagates, the nonlinear behavior of the air causes the pressure disturbance to form an "N" shape with a rapid onset, a ramp to the minimum pressure, and then an abrupt offset. Most events within an indoor environment do not cause a shock wave. For example, a door slamming, while perceived as loud to someone within its hearing, does not cause a shock wave such as that which results from the supersonic travel of a projectile. Thus, detection of a shock wave can be an important factor in gunshot detection. However, shock waves are largely dependent on the orientation of projectile motion. Hence, the direction of the gunshot in relation to the gunshot detector can affect the magnitude of the detected shock wave. Furthermore, there can be a muzzle blast, which is the sound caused by the discharge of the firearm. A typical firearm uses a confined explosive charge to push the bullet out of the gun barrel. The hot, rapidly expanding gases cause a muzzle blast to emerge from the barrel. The acoustic disturbance can have a duration in the range of 3 to 5 milliseconds and propagates through the air at the speed of sound.

Techniques and devices in this disclosure provide for improvements in gunshot sensor testing to address the aforementioned issues. In embodiments, the gunshot sensors are put into a test mode. The test mode can be a mode of increased sensitivity. Once a gunshot sensor is in the test mode, a gunshot sensor tester is placed over the gunshot sensor, and acoustic and/or infrared inputs are provided to the gunshot sensor for testing. The acoustic inputs are considerably less loud than an actual gunshot, so there is less disturbance to occupants of the building. Furthermore, acoustic material within and/or on the gunshot sensor tester further deadens the sound, reducing the impact to the occupants of the building. Once the test is complete, the gunshot sensor can be automatically configured back to a normal mode of operation, either through a timeout mechanism, or by an explicit command from a connected gateway device (server). The results of the gunshot sensor tests can be conveniently sent to a mobile device. Thus, the disclosed techniques provide for easy testing of gunshot sensors after an installation, and/or during periodic inspections and/or maintenance.

FIG. 1 is a diagram of a cross section of a gunshot sensor evaluation device. A gunshot sensor evaluation device 100 can evaluate a gunshot sensor 110 that is mounted on a surface 120. The surface 120 can include a vertical surface such as a wall, a horizontal surface such as a ceiling, an inclined surface, etc. In embodiments, a plurality of gunshot sensors 110 can be deployed on a plurality of surfaces 120. The plurality of gunshot sensors 110 deployed on the plurality of surfaces 120 can comprise a gunshot detection system in a building, in a space such as a conference room, in a convention hall, in a gymnasium, in a school, in an airport, in a municipal building, and so on. The gunshot detection system can include various integrated systems, called integrations, such as a camera system, an access control system, a mass notification system, and so on. The gunshot sensor evaluation device can be used to evaluate the operation of a gunshot sensor, to calibrate a gunshot sensor, to verify a gunshot sensor, to certify operation of a gunshot sensor system, to verify integrations for the gunshot sensor system such as a mass notification system, and so on. The gunshot sensor evaluation device can be used to verify downstream operations of the gunshot sensor system, such as a system that activates a particular camera associated with the gunshot sensor being tested.

The gunshot sensor evaluation device 100 is an apparatus that comprises a housing 130 that holds an acoustic generator 140 and infrared generators 142 and 144. The housing can comprise plastic components, molded plastic, carbon fiber, a composite material, metal, or any other suitable substance. The housing can comprise a substance with various acoustic properties that can include sound deadening and so on. The housing can be in a shape that can partially cover (not shown) a gunshot sensor 110 or can completely cover (as shown) the gunshot sensor 110. The housing can be in a shape to cover a typical wall switch-box sized object such as a single-gang or dual-gang in-wall junction box, a single-gang or dual-gang surface mount (on-wall) junction box, and so on. The housing can be rectangular, cubic, semi-spherical, or another shape that can cover the gunshot sensor. The housing can be formed from a single piece of a substance. In alternative embodiments, the housing can comprise multiple pieces fitted, bolted, screwed, glued, welded, or otherwise affixed together.

The gunshot sensor evaluation device 100 can further include a gasket 132 on the housing 130. The gasket 132 on the housing 130 can improve an acoustic, electromagnetic, and/or light seal around the gunshot sensor 110. The gasket can provide an acoustic perimeter seal between the housing and the gunshot sensor, which can enable acoustic (and light) transmission from the housing components while blocking (or attenuating) acoustics (and light) from escaping to the ambient environment. The gasket on the housing can provide acoustic deadening. In embodiments, the gasket 132 may include acoustic foam. The acoustic foam can include an open cell foam, a closed cell foam, and so on. The foam can include acoustic characteristics such as isolating, sealing, deadening, and other characteristics. The gasket 132 can include an acoustic sheet. The acoustic sheet can include acoustic absorption, acoustic reflection, acoustic focusing, and other acoustic characteristics. In embodiments, the gasket is configured to abut the gunshot sensor and form a tight, complete seal between the tester and the faceplate of the gunshot sensor as shown. In other embodiments, the gasket can be configured to make a tight, complete seal to the surface on which the gunshot sensor is mounted. The gunshot sensor evaluation device further includes sound deadening material 136 within the housing 130 for audio isolation. The sound deadening material 136 can be used for sound absorption and so on. The sound deadening material can include sound fidelity characteristics. In embodiments, the sound deadening material may include acoustic foam, acoustic wool, and/or acoustic cotton.

The gunshot sensor evaluation device 100 further includes an acoustic generator 140 used in testing of a gunshot sensor. The acoustic generator can be coupled to the housing 130 wherein the housing covers the gunshot sensor 110. The acoustic generator 140 can include a speaker, a transducer, or another acoustic generation component. The acoustic generator can be capable of generating various acoustic waveforms including an acoustic pulse, a series of sound pulses, periodic acoustic waveforms, and so on. In other embodiments, the acoustic generator can be configured to generate high sound pressure level acoustic signals that mimic gunshot events. In some embodiments, the attack (increase) of the acoustic wave, duration of the acoustic wave, and the decay (decrease) of the acoustic wave can be adjusted to represent possible gunshot events from various types of firearms, firecrackers, explosives, vehicle backfires, and so on. The waveforms generated by the acoustic generator can be periodic. The gasket 132 and the sound deadening material 136 coupled to the housing 130 can isolate the acoustic generator 140 from the region outside the housing. The sound deadening material can support use of the acoustic generator for gunshot detector testing while the room or space covered by the gunshot sensor is being used for purposes other than testing of the gunshot sensor. The gunshot sensor can be set into a mode for detecting a specific acoustic tone or sequence of tones where the tones are reasonably quiet, the tester provides the tones, and the sound deadening material further quiets the tones to those around the tester. In this manner, the testing can be accomplished without disruption to normal occupant activities.

In embodiments, the gunshot sensor evaluation device 100 further includes an infrared (IR) generator 142 used in testing of a gunshot sensor. The IR generator 142 can be coupled to the housing 130 and can be used either in conjunction with or separately from the acoustic generator and IR generator 144. The IR generator 142 can be a near-infrared wavelength generator that can mimic the light flash of a gunshot. In some embodiments, the IR generator can include a light emitting diode that emits light in the IR spectrum (IR-LED). Other semiconductor components such as laser diodes can also be used as an IR generator. The IR generator can simulate events corresponding to gunshot events such as muzzle flashes. The IR signals generated by the IR generator can be varied to simulate various types of IR signals associated with gunshot events. The IR signals can include a single IR pulse, a periodic series of IR pulses, aperiodic pulses that can simulate random gunshot events including rapid gunshot events, and so on. In embodiments, the IR generator 142 and the acoustic generator 140 are synchronized to verify correct gunshot sensor system evaluation of acoustic and IR input. For example, an acoustic event that happens before an IR event should not normally be detected as a gunshot. Though the gunshot produces both light and sound, the light travels significantly faster than the sound and should normally be detected prior to the sound, not after the sound.

In embodiments, the gunshot sensor evaluation device 100 further includes an infrared (IR) generator 144 used in testing of a gunshot sensor. The IR generator 144 can be coupled to the housing 130 and can be used either in conjunction with or separately from the acoustic generator and IR generator 142. The IR generator 144 can be a mid-infrared wavelength generator that can be used to stimulate a passive infrared detector in the gunshot sensor. The passive infrared detector may be used by the gunshot sensor to switch power consumption modes.

The gunshot sensor evaluation device can further include a handle 138. The handle 138 can be coupled to the housing 130 using an adjustable coupling as shown, a fixed coupling, a detachable coupling, and so on. The handle 138 can be comprised of wood, metal, fiberglass, carbon fiber, composite, and other materials suitable to placing the gunshot sensor evaluation device over a gunshot sensor for testing, calibrating, verifying, and other purposes. The handle 138 can be removable. In embodiments, the handle can extend in order to increase the reach of the gunshot sensor evaluation device. The handle 138 extends the housing 130 to an elevation for the gunshot sensor, allowing the gunshot sensor evaluation device 100 to be placed over a gunshot sensor 110. In use, the gunshot sensor evaluation device 100 is placed over a gunshot sensor 110 such that the gasket 132 of the gunshot sensor evaluation device is flush against the surface 120 on which the gunshot sensor 110 is installed. In embodiments, the adjustable coupling allows the angle between the handle 138 and the housing 130 to be adjusted to accommodate an angle of the surface 120 to which gunshot sensor 110 is mounted. In embodiments, the adjustable coupling allows the angle between the handle and the housing to be adjusted for comfort and ease of an operator using the gunshot sensor evaluation device.

Once the gunshot sensor evaluation device housing 130 is in position, the acoustic generator 140 and/or the infrared generator 142 and the infrared generator 144 may be activated to provide stimuli to the gunshot sensor 110. In embodiments, the infrared generator 142 can generate visible and near-visible infrared light. In some embodiments, the near-visible infrared wavelengths include those ranging from 0.78 to three microns. The gunshot sensor evaluation device can be triggered by a switch, a button, a trigger, a timer, a remote wired connection, a remote wireless connection, and so on. Initiation of gunshot sensor evaluation can coincide with triggering the gunshot sensor evaluation device, can be time delayed, etc. In embodiments, the trigger device can be coupled to the handle 138 of the gunshot sensor evaluation device and can be activated by an operator. In embodiments, the gunshot sensor 110 can be placed into a testing mode prior to activation of the acoustic generator 140 and/or the infrared generator 142. In embodiments, infrared generator 144 can change an operation mode of the gunshot sensor prior to activation of the acoustic generator 140 and/or the infrared generator 142. Results of evaluation of the gunshot sensor can be collected and evaluated to determine operation of the gunshot sensor. The results can include data pertaining to detecting an acoustic waveform, detecting an IR waveform, detecting both acoustic and IR waveforms, and so on. The results can include additional data that can be obtained from the gunshot sensor, where the data can include text and other data formats.

Figure 2:
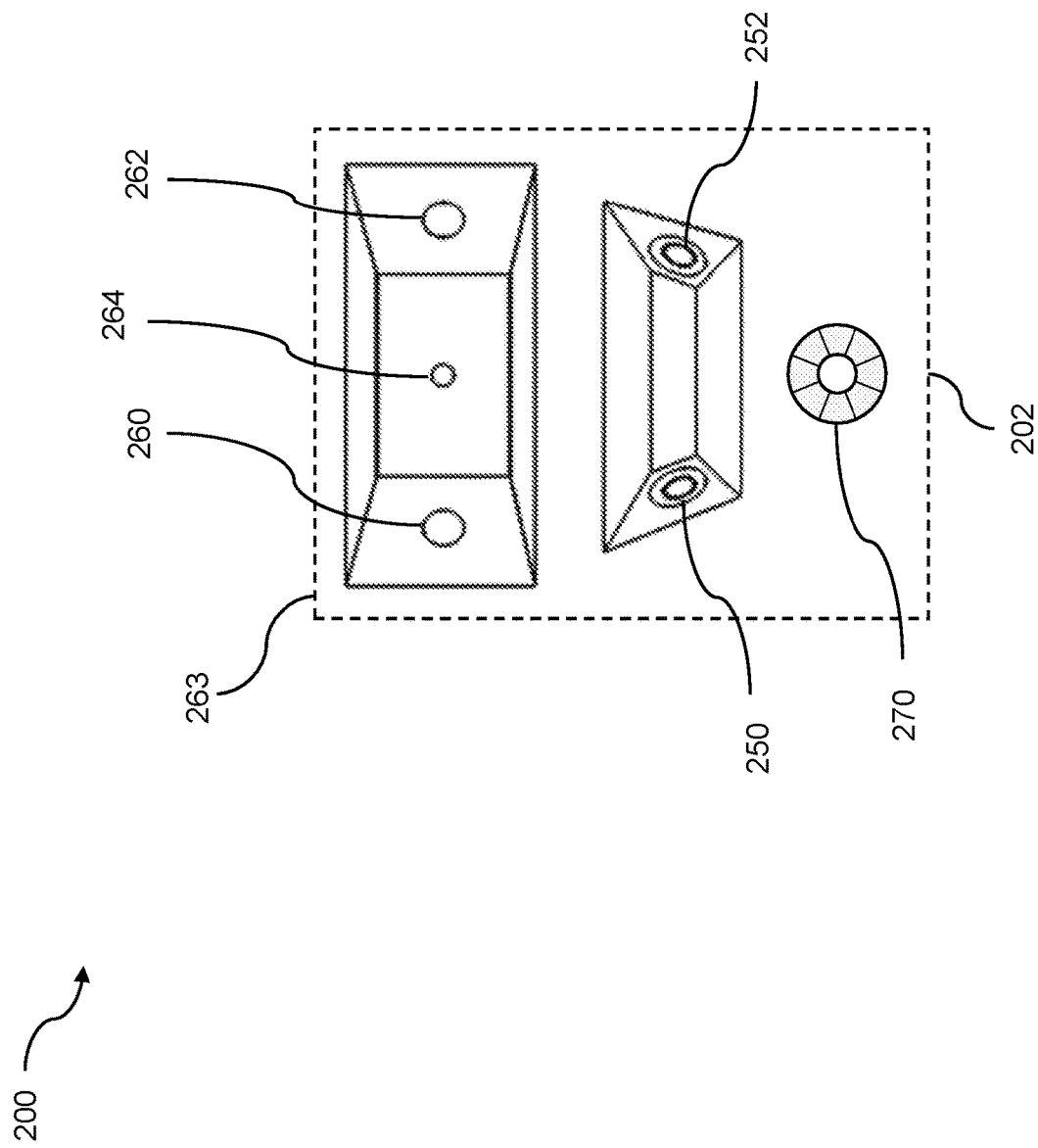
FIG. 2 is a diagram of a gunshot sensor.

FIG. 2 is a diagram of a gunshot sensor 200. The gunshot sensor 202 is diagrammatic of a gunshot sensor testable by the disclosed gunshot sensor evaluation device (not shown). The gunshot sensor 202 can include near-infrared (NIR) sensors 250 and 252, mid-infrared (MIR) sensor 270, acoustic sensors 260 and 262, and a microphone 264. The acoustic sensors 260 and 262, and microphone 264 may be mounted on a faceplate 263. The gunshot sensor evaluation device is configured and disposed to fit over the gunshot sensor 202 to perform testing of the acoustic sensors, infrared sensors, and/or the microphone. The housing that covers the gunshot sensor can cover a faceplate for the gunshot sensor. The housing can be sized so that it is slightly larger than the faceplate, to ensure proper positioning during the testing of the gunshot sensor.

Figure 3:
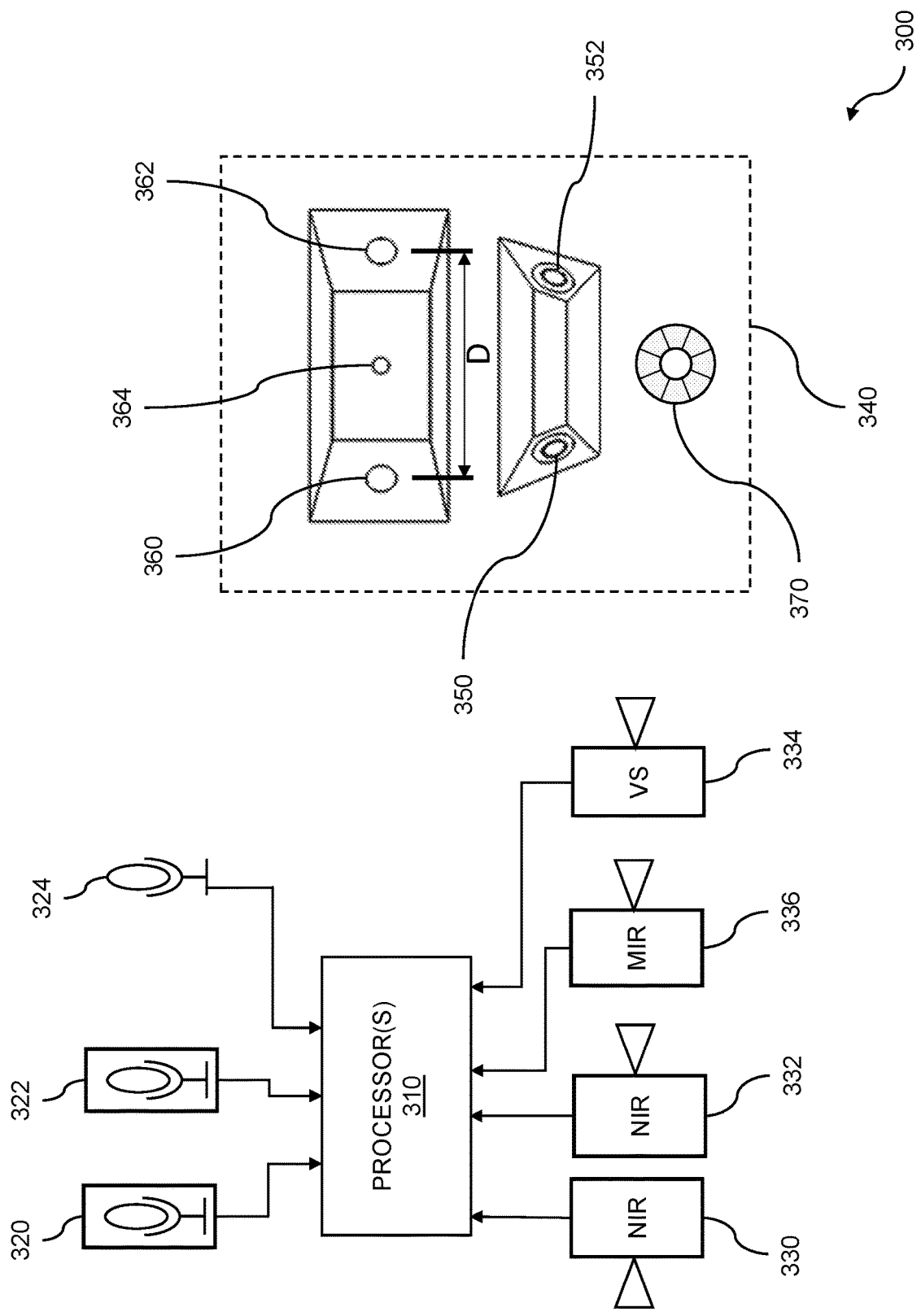
FIG. 3 is a diagram of a gunshot sensor unit.

FIG. 3 is a diagram of a gunshot sensor unit. Indoor gunshot detection can be based on infrared information and acoustic information, where both types of information can be obtained within an indoor environment. Video collection can be engaged based on the detecting of the gunshot. Video analytics can be performed for tracking a suspected shooter using the collected video. An audio microphone can be activated based on the detection of the gunshot. The tracking of the shooter can be further based on the audio microphone that was activated. An example of a gunshot sensor unit 300 for indoor gunshot detection is shown. A sensor can include one or more processors 310, two near-infrared sensors 330 and 332, a mid-infrared sensor 336, two acoustic sensors 320 and 322, and a microphone 324. The microphone 324 can be a surveillance microphone that is normally disabled and is only enabled in response to detection of a possible gunshot. The infrared sensors 330 and 332 can be used to obtain near-infrared information, where the infrared information can include a muzzle flash, a flash from an explosion, heat from a flame, etc. The acoustic sensors 320 and 322 can be used to detect sound pressure level (SPL) events such as shock waves, where the sound pressure levels of the events can be compared to the SPLs of muzzle blasts from gunfire, explosions, and other similar events. The microphone 324 can be activated based on detecting a gunshot. The microphone 324 can be used for tracking a suspected shooter. The microphone can be activated for a first limited period of time. The first limited period of time can include times when the microphone is active, and any audio information collected during the first limited period of time can be used for a variety of purposes, such as diagnostic purposes. The microphone can remain active for a second limited period of time. The second period of time can be used for information gathering, including tracking information. The information collected from the microphone can be discarded after a third limited period of time. The discarding of information collected by the microphone can serve various purposes including security, confidentiality, and so on.

In some embodiments, the microphone 324 is configured to be operative during normal conditions at a very low gain, such that it only detects sounds in excess of 110-130 decibels. In this way, the microphone 324 can be used to detect sounds from gunshots without picking up other sounds, such as conversations. Once a gunshot is detected, the gain is adjusted so that the microphone 324 can pick up additional information to help law enforcement assess the situation. Thus, once a gunshot is detected, the microphone gain can be adjusted to pick up sounds at a lower sound level (e.g. 50 decibels) so that conversations and other sounds can be detected during the emergency situation.

A gunshot sensor can further include a video system 334. The video system 334 can include a video camera and additional sensors used to capture video data and can be configured to activate upon detection of a possible gunshot. Embodiments perform video analytics based on video obtained from the video system 334. The video analytics can track a suspected shooter of the gunshot using the video that was collected.

An example gunshot sensor 340 is shown. The gunshot sensor 340 can include near-infrared (NIR) sensors 350 and 352, mid-infrared (MIR) sensor 370, acoustic sensors 360 and 362, and a microphone 364. The acoustic sensors 360 and 362 can be oriented at different angles and spaced apart by a distance D. In some embodiments, the distance D is 1.25 inches. Since a shock wave from a bullet is directional, one of the acoustic sensors (e.g. 360) might detect the shock wave while the other sensor (e.g. 362) might not. This information can be used as part of a forensics analysis to estimate a trajectory of a fired projectile/bullet. Similarly, the IR sensors 350 and 352 can also be disposed at different angles to increase the range of coverage.

The gunshot sensor can include video cameras and an analyzer. The analyzer can be used to detect a gunshot, in an indoor environment, based on the infrared information and the acoustic information. In embodiments, the analyzer is implemented by code executing on the one or more processors 310. The analyzer can perform video analytics based on video obtained from the video cameras. The video analytics can track a suspected shooter of the gunshot using the video that was collected. While one configuration of IR sensors, acoustic sensors, and a microphone is shown, other embodiments include different numbers and configurations of the IR sensors, acoustic sensors, and the microphone. In other embodiments, additional IR sensors, acoustic sensors, microphones, video sensors, and processors are present in the gunshot sensor. In some embodiments, the gunshot sensor 340 is sized to fit into a standard 4×4 inch opening such as an opening used for a double light switch or a double electrical receptacle. In this way, gunshot sensors of disclosed embodiments are easily installed within existing infrastructure.

Thus, the gunshot sensor can comprise an infrared sensor and an acoustic sensor. Furthermore, the gunshot sensor can further comprise a second infrared sensor and a second acoustic sensor. The infrared sensor and the second infrared sensor can be directed to cover different fields of view. The acoustic sensor and the second acoustic sensor can be set to a threshold above the level of typical verbal communication. The acoustic sensors can be configured to detect shock waves, and/or very loud sounds (e.g. 110-130 decibels or higher). The one or more processors 310 can comprise an analyzer for the gunshot detection system. The analyzer can be integrated into the gunshot sensor unit 300 or can be located in a separate housing remote from the unit. The analyzer can be part of a gateway which receives input from one or more gunshot sensors via a wired, wireless, or optical connection. The gateway can be located at a central control center located within a building that has the gunshot sensor system installed. Alternatively, the gateway can be located remotely from the building, for example, at a security monitoring service facility. The analyzer can evaluate the acoustic and IR input from the one or more gunshot sensors. The analyzer can evaluate the shape of the acoustic and IR pulses, the rise time and fall time of the acoustic and IR pulses, the synchronization of the acoustic and IR pulses, the timing of the acoustic and IR pulses, and so on.

Figure 4:
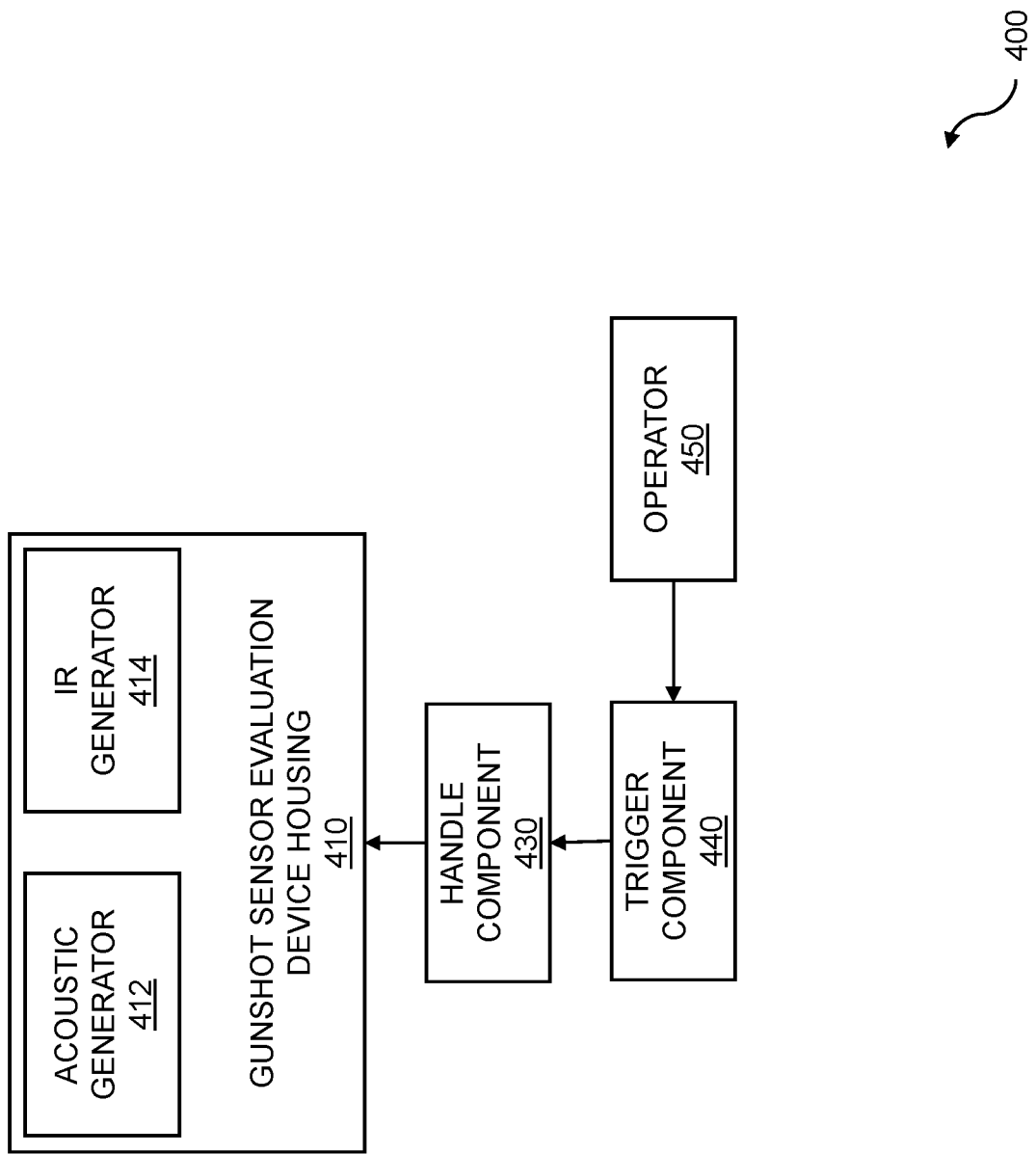
FIG. 4 is a block diagram of a gunshot sensor tester.

FIG. 4 is a block diagram of a gunshot sensor tester. A block diagram of a gunshot sensor evaluation device 400 is shown. The gunshot sensor evaluation device 400 includes a housing 410. Disposed within the housing 410 are an acoustic generator 412 and an infrared generator 414. A handle component 430 is mechanically coupled to the housing 410. A trigger component 440 is configured and disposed to trigger the acoustic generator 412 and/or infrared generator 414 to perform testing. The trigger component 440 can include a button or a switch located on the housing 410. Thus, in embodiments, the apparatus includes a switch which activates the acoustic generator. In embodiments, multiple trigger modes are possible. Embodiments include an instantaneous mode, where as soon as a user presses the button, the acoustic generator 412 and/or infrared generator 414 are activated to perform testing. In embodiments, the infrared generator 414 is used in testing the gunshot sensor. In embodiments, the infrared generator 414 provides a series of pulses. In embodiments, the infrared generator 414 includes one or more near-infrared generators and one or more mid-infrared generators.

In embodiments, one or more delay trigger modes are included. Thus, in embodiments, the acoustic generator 412 is delayed from when the switch is activated. In some embodiments, there is a five second delay mode, where the acoustic generator 412 and/or infrared generator 414 are triggered five seconds after the user presses the button. In other embodiments, there is a ten second delay mode, where the acoustic generator 412 and/or infrared generator 414 are activated ten seconds after the user presses the button. Other delay durations are possible. In some embodiments, the delay is user-programmable, and the operator (user) sets the delay by pressing and holding the button for a predetermined amount of time. For example, in embodiments, when the button is pressed and held for a certain duration, it changes the trigger mode from a default mode to a new mode. In some embodiments, when the button is held for a duration of one second, the mode changes. Furthermore, in some embodiments, the acoustic generator is triggered briefly to issue an audible confirmation of the new mode to the user. For example, the default mode can be a five second delay. When the user presses and holds the button (switch) for one second, the gunshot sensor evaluation device 400 is set to the next mode, of a ten second delay. In embodiments, the IR generator 414 generates a mid-infrared light pulse before generating a near-infrared light pulse.

In embodiments, a short pulse is issued from the acoustic generator to indicate the mode change. When the user again presses and holds the button for one second, the gunshot sensor evaluation device 400 is set to the next, instantaneous mode (zero delay). In embodiments, two short pulses are issued from the acoustic generator to indicate the mode change. When the user again presses and holds the button for one second, the gunshot sensor evaluation device 400 is set to the default mode of five seconds. In embodiments, one relatively longer pulse is issued from the acoustic generator to indicate the mode change. The short pulses can range from about 500 milliseconds to one second, and the long pulse can range from about two seconds to about three seconds. Other durations are possible. Thus, in embodiments, the switch activating the acoustic generator is configured to select a triggering mode from a plurality of triggering modes. The trigger component 440 as operated by an operator 450 enables the operator (user) to have time to properly position the gunshot sensor evaluation device 400 over a gunshot sensor prior to activating the acoustic generator 412 and/or infrared generator 414. In some embodiments, the trigger component 440 includes an external switch jack. The external switch jack allows connection of an external wired switch for activating the acoustic generator 412 and/or infrared generator 414. With these embodiments, the gunshot sensor evaluation device 400 is placed in the proper position over the gunshot sensor, and then the testing of the gunshot sensor is initiated by activating the external wired switch. In some embodiments, the gunshot sensor evaluation device 400 includes a wireless communication interface, such as a Bluetooth™ interface. In these embodiments, the external switch is wireless and is enabled from an application on a mobile computing device, such as a smartphone or tablet computer.

Figure 5:
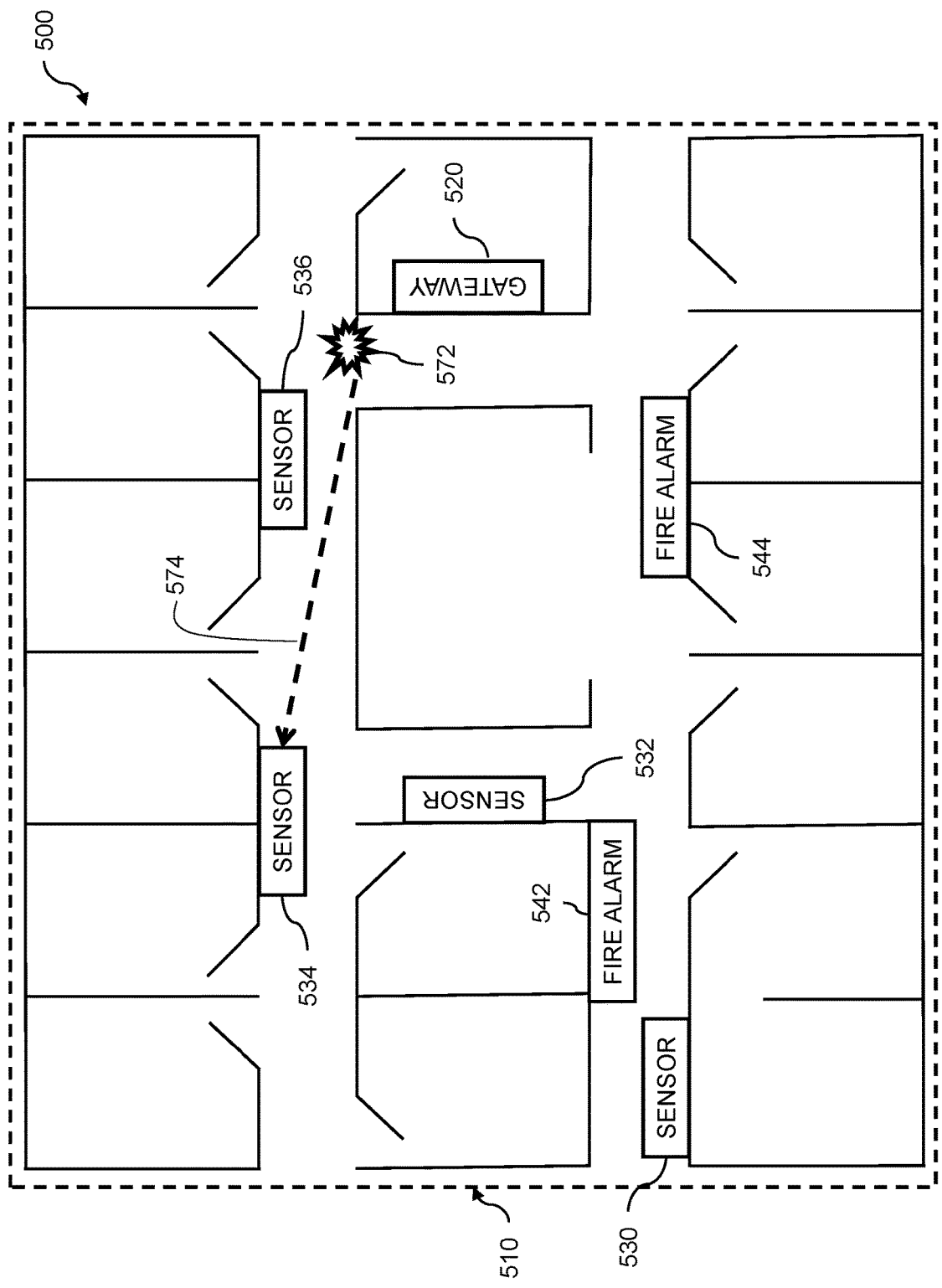
FIG. 5 is an example indoor sensor configuration.

FIG. 5 is an example indoor sensor configuration. The indoor area 500 has a perimeter 510 and can be similar to an office environment, with a plurality of individual rooms. A plurality of gunshot sensors 530, 532, 534, and 536 are installed at various positions within the area 500. A plurality of fire alarms 542 and 544 are also installed at various positions within the area 500. A gateway 520 is installed within the area 500 and is configured to receive inputs from the plurality of gunshot sensors 530, 532, 534, and 536. In embodiments, the gateway 520 communicates with the gunshot sensors via a wired communication interface, such as Ethernet or RS-232. In other embodiments, the gateway 520 communicates with the gunshot sensors via a wireless interface such as WiFi. In such embodiments, each gunshot sensor is further equipped with a WiFi communication interface. The gateway 520 can include both wireless and wired communication interfaces. In embodiments, the gateway 520 also receives input from the plurality of fire alarms 542 and 544. In such embodiments, when a fire alarm is activated, information pertaining to the time and duration of each strobe and/or buzzer activation of the fire alarms is communicated to the gunshot sensors, such that the gunshot sensors can compensate for the active fire alarm. In some embodiments, the compensation includes utilization of windowing techniques. In this example, a gunshot is fired at location 572, causing a projectile trajectory as indicated by path 574. In this situation, the gunshot sensor 536 is closest to the path 574. As the projectile/bullet passes by the gunshot sensor 536, a shock wave from the projectile is received by the acoustic sensors within the gunshot sensor 536. In the case of a gunshot sensor such as the gunshot sensor 340 of FIG. 3, the acoustic sensors are spaced apart by a distance D. In this configuration, each acoustic sensor within the gunshot sensor receives the shock wave at a slightly different time. This difference in time can be used to infer information about the gunshot, such as the approximate direction from which the projectile was fired, and/or the approximate speed of the projectile.

The gunshot sensors can be deployed throughout an indoor space. The indoor space can include rooms such as hotel rooms, hospital rooms, and classrooms; hallways; common areas such as lounges, meeting rooms, and lobbies; gymnasiums, cafeterias, stairwells, and restrooms; and so on. Therefore, the gunshot sensors can be used to determine that a gunshot event has occurred, and this occurrence can be determined independently of the specific position of the gunshot sensor(s). Thus, the gunshot sensors do not require knowledge of their position, and the gunshot detection system does not require knowledge of the specific locations of the sensors. The goal of gunshot detection analysis is to accurately detect that a gunshot has occurred.

Environmental and manmade sources can potentially confound the infrared sensor and the acoustic sensor because the environmental and manmade sources can produce infrared signals and acoustic signals that are similar to those produced by gunshot events. An example of an environmental signal source is a reflected flash of sunlight off a moving vehicle, mirror, or another shiny object. An example of a manmade source is a strobe. Strobes are ubiquitous and are used to serve many purposes, including emergency and danger warnings, alerts, and so on. Strobes are commonly deployed in buildings for purposes such as fire alarms and other warning systems and are routinely displayed on vehicles such as emergency vehicles, forklifts, transport vehicles, carts, heavy equipment, school buses, dangerous equipment, and so on. Other common uses of strobes include specialty lighting with uses for photography, public gathering places (e.g. dance clubs), halogen lights, etc. A strobe flash contains visible light spectra and can "bleed over" into other spectra, including infrared, which can cause a false gunshot detection. In embodiments, analysis is performed to detect that several strobes have occurred and that these occurrences create a problem for gunshot evaluation. In some cases, an environmental cause can be determined and changes to the environment can be recommended. For instance, a gunshot sensor can be physically moved so that it does not pick up reflected sunlight from cars parked in a nearby parking lot that is visible through a window in a building. Other similar changes can be recommended for the gunshot sensors or for the surrounding environment. Thus, in the example 500, the location of the gunshot sensor can be verified at a server using the acoustic generator. Furthermore, in the example 500, the gunshot sensor can be verified as operational at the gunshot sensor.

Figure 6:
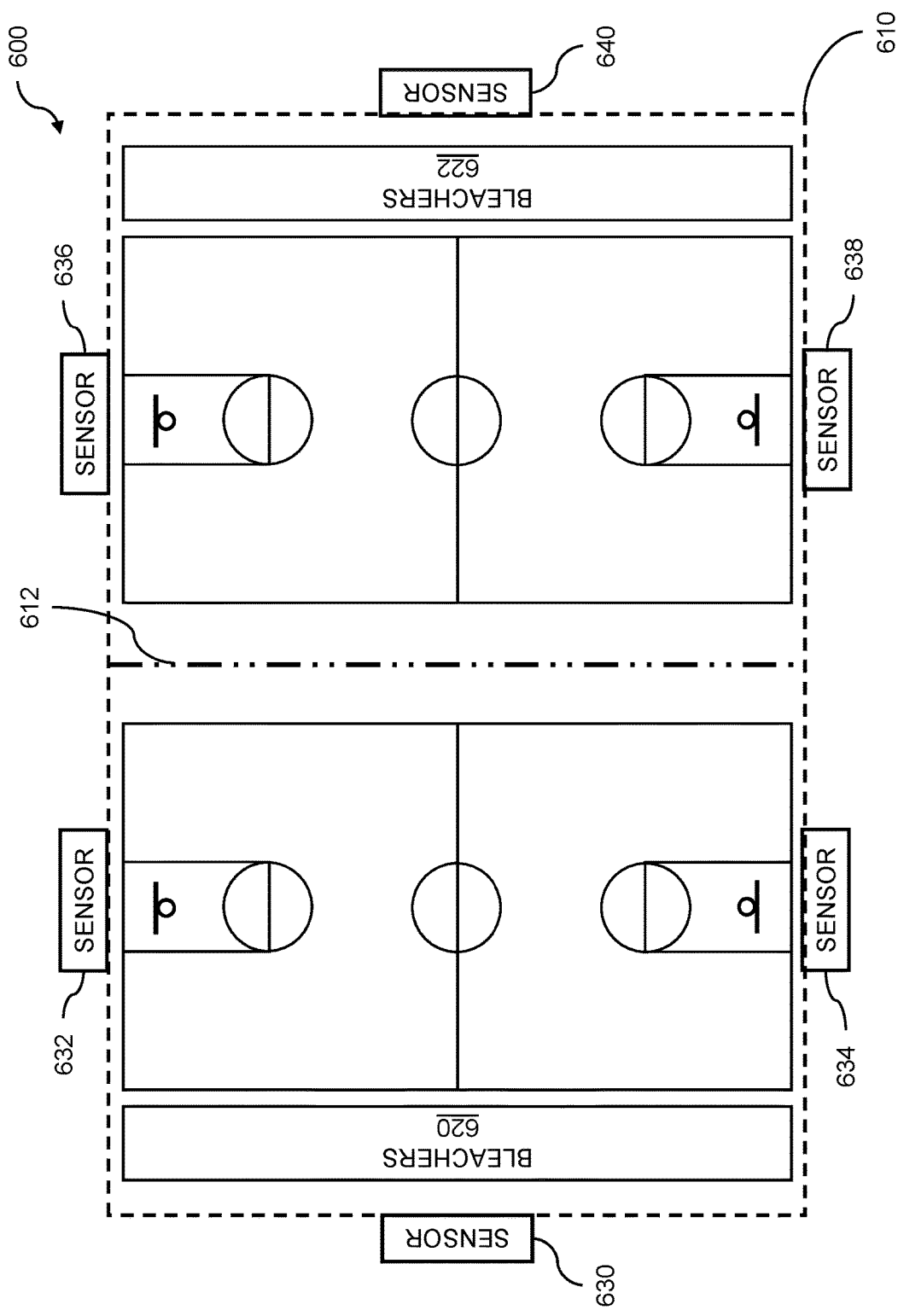
FIG. 6 is an example indoor sensor configuration with six sensors.

FIG. 6 is an example 600 of indoor sensor configuration with six sensors installed in a split gymnasium area 610. As is common in a school gymnasium, a moveable wall 612 can be extended to partition a gymnasium into two smaller areas. In such situations, a six-gunshot sensor configuration can be used, including the gunshot sensors 630 and 640 installed on the shorter walls of the gymnasium, and the gunshot sensors 632, 634, 636, and 638 installed on the longer walls of the gymnasium. Loud noises from events, such as opening or collapsing the bleachers 620 and 622, do not trigger false alarms with the gunshot sensors of disclosed embodiments. Even though manipulating the bleachers can make loud noises, it does not generate shock waves or infrared signatures, and thus disclosed embodiments discern that such activity does not result from gunshots. In the example 600, the acoustic generator can be used for testing of multiple gunshot sensors. This can be accomplished efficiently with the gunshot sensor tester of disclosed embodiments.

Figure 7:
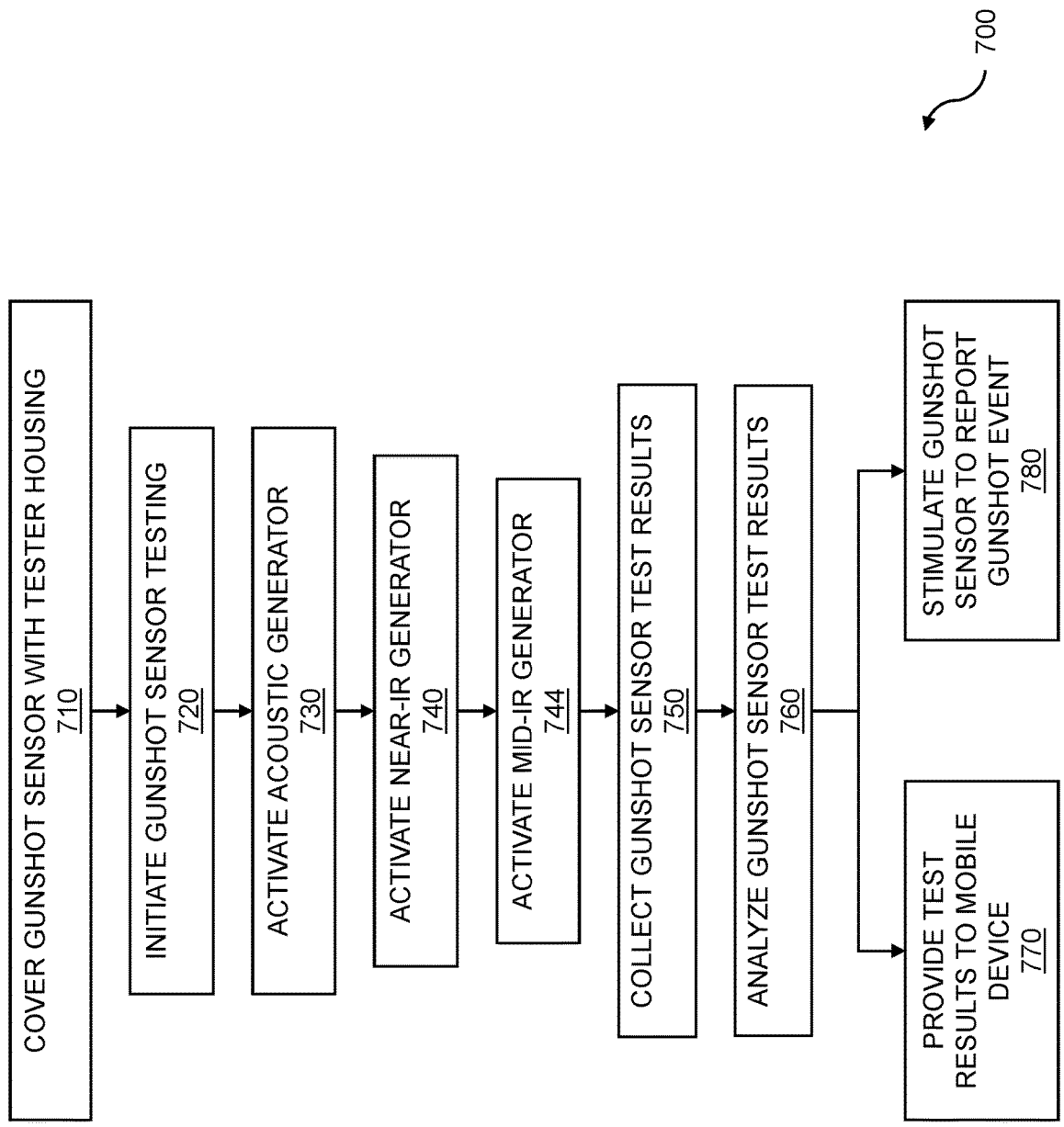
FIG. 7 is a flow diagram for using a gunshot sensor tester.

FIG. 7 is a flow diagram for using a gunshot sensor tester (gunshot sensor evaluation device). The flow 700 illustrates a processor-implemented method for sensor evaluation. The flow 700 starts with covering a gunshot sensor with a tester housing 710. The flow 700 continues with initiating gunshot sensor testing 720. This can include activating the gunshot sensor tester with an instantaneous activation and/or a delay mode activation. In embodiments, the activation is performed via an external wired switch. In embodiments, the activation is performed via an application operating on a mobile device to wirelessly activate the gunshot sensor tester. The initiating of testing can additionally include placing the gunshot sensor into a test mode. The test mode can change various settings on the acoustic and/or infrared sensors within the gunshot sensor. This can include changing gain/attenuation settings on the gunshot sensor to a mode where they are configured to properly receive the stimuli from the gunshot sensor tester. In some embodiments, the test mode includes tuning filters and/or other circuitry for increased sensitivity at a particular acoustic and/or infrared frequency. Thus, in embodiments, the particular frequency matches a test mode setting for the gunshot sensor. In some embodiments, the test mode includes activating a microphone that is normally disabled unless a gunshot is detected. In embodiments, a gateway device is used to perform this configuration. In embodiments, the test mode has an expiration time. With these embodiments, the gunshot sensors automatically revert from test mode to normal mode at the expiration time. For example, the gunshot sensors can be placed in a test mode with an expiration time of thirty minutes. Thus, after thirty minutes, the gunshot sensors can automatically revert to normal mode. In this way, if an operator forgets to return a gunshot sensor to normal mode after the test, it will still revert to normal mode for proper operation.

The flow 700 continues with activation of the acoustic generator 730. In embodiments, this includes issuing one or more audible pulses. In embodiments, the acoustic generator provides a series of pulsed tones. The tones can range in frequency from 20 Hz to 16 kHz. In embodiments, the acoustic generator emits a particular frequency, such as a substantially 3 kHz frequency at a substantially 90 dB to 100 dB volume. In some embodiments, activating the acoustic generator includes issuing one or more focused shockwaves. The focused shockwaves can be generated by an acoustic generator that includes a shockwave generation component for generating focused shockwaves. The focused shockwave component can include, but is not limited to, an electrohydraulic source, a piezoelectric source, and/or an electromagnetic source. In embodiments, the acoustic generator is pulsed at several different frequencies. In embodiments, the acoustic generator frequency is swept from substantially 300 Hz to substantially 9 kHz in order to test bandwidth coverage. In embodiments, the acoustic generator sweeps tones rather than pops or short, sharp sound pulses.

The flow 700 continues with activating the near-infrared (NIR) generator 740. The activation of the infrared generator 740 is used to test the infrared sensors of the gunshot sensor. The infrared generator can provide a series of pulses. In embodiments, the pulses are of one or more wavelength(s) that represent an infrared signature consistent with firearm discharge. In embodiments, the output of the infrared generator is at a wavelength ranging from 0.78 to three microns. The IR generator activation can be synchronized with the acoustic generator activation. The synchronization can be used to check for proper gunshot sensor system evaluation of the IR and acoustic input.

The flow 700 continues with activating the mid-infrared (MIR) generator 744. The activation of the infrared generator 744 is used to test the passive infrared sensors of the gunshot sensor. The infrared generator can provide a series of pulses. In embodiments, the pulses are of one or more wavelength(s) that represent an infrared signature consistent with motion detection. In embodiments, the output of the infrared generator is at a wavelength ranging from 3 to 50 microns. The MIR generator activation can be synchronized with the acoustic generator activation and the NIR generator activation. The synchronization can be used to change the mode of the gunshot sensor from a low power mode to a higher power mode before subsequent gunshot sensor system evaluation. Thus, the sequence of flow 700 steps 730, 740, and 744 can be reordered to provide additional testing functionality. Thus, the synchronization can be used to check for proper gunshot sensor system evaluation of the IR and acoustic inputs along with sensor mode control.

The flow 700 continues with collecting gunshot sensor test results 750. These results can be in the form of one or more waveforms, and/or a Boolean indication of pass or fail. The flow 700 continues with analyzing the gunshot sensor test results 760. In some embodiments, the waveforms are processed at the gateway device to derive a pass/fail result based on criteria such as signal quality, temporal response, and/or frequency response of the stimuli from the gunshot sensor tester. The flow 700 continues with providing the test results to a mobile device 770. In embodiments, this is performed by the gateway sending a message to the mobile device. The message can be an e-mail, text message, or another suitable format. In embodiments, the mobile device executes an application in which to display the test results. The test results can include, but are not limited to, a pass/fail indication, a date/time of the test, a facility address where the test occurred, and a location of the sensor (which can include a floor number and/or additional location information). The test results can further include a device identifier and/or a device address (e.g. an IP address, MAC address, or the like). In embodiments, the gunshot sensor test results are used in conjunction with a floorplan of the building in which the gunshot sensor system is installed. A representation of the floorplan and each of the gunshot sensors included in the gunshot sensor system of the building can be updated with a mark showing successful or unsuccessful testing of each sensor. The representation can also be updated to show whether or not testing evaluation, video activation, etc. of the gunshot sensor system was successful.

In embodiments, the flow 700 can include sending automatic notification to law enforcement officials, facility officials, municipal officials, school officials, news agencies, mass notifications, and the like. The notification can include digital radio notifications, email notifications, text message notifications, phone call notifications, web-site notifications, voice mail notifications, and so on. In embodiments, a system for gunshot detection covers an indoor environment, wherein the system provides automatic notifications, based on both the analyzing to determine the gunshot occurrence and the evaluating, to provide gunshot false alert detection.

In some embodiments, the gateway receives a test signal input from the gunshot sensor upon completion of the testing. The gateway then returns the gunshot sensor to normal mode. Thus, in some embodiments, the gateway automatically changes the mode of the gunshot sensor from a testing mode to a normal mode upon receiving a test input signal from the gunshot sensor. The flow 700 includes stimulating the gunshot sensor to report a gunshot event 780. Some embodiments include a processor-implemented method for sensor evaluation comprising: using an acoustic generator in the testing of a gunshot sensor, wherein the acoustic generator is connected to a housing wherein the housing covers the gunshot sensor; detecting a switch activating the acoustic generator; and stimulating the gunshot sensor to report a gunshot event. In some embodiments, the gunshot event is classified as a test-mode gunshot. Some embodiments further comprise providing automatic notifications based on the gunshot event being classified as a test-mode gunshot, wherein the automatic notifications include digital radio notifications, email notifications, text message notifications, phone call notifications, web-site notifications, or voice mail notifications.

In addition to providing mass notifications based on the gunshot sensor testing, other integrated systems can be activated by a successful test result, an unsuccessful test result, or both a successful or an unsuccessful result. The testing can activate a camera based on the testing. The camera can be integrated into the gunshot sensor itself or can be integrated into the gunshot sensor system as a discrete camera. Additional testing result checking can ensure that the proper camera is activated, that is, the camera most closely associated with the gunshot sensor under test. The testing can also activate an access control system, wherein the access control system provides centralized or remote control of the operation of the gunshot sensor and its associated system.

In the flow 700, the method includes using an acoustic generator used in testing of a gunshot sensor, wherein the acoustic generator is connected to a housing, wherein the housing covers the gunshot sensor. Furthermore, in the flow 700, the method can include detecting a switch activating the acoustic generator. Note that while the flow 700 indicates activation of an acoustic generator followed by activation of an infrared generator, in embodiments, the infrared generator is activated first. These are both examples of sequential activation. Alternatively, both the acoustic generator and the infrared generator can be activated simultaneously (parallel activation). Various steps in the flow 700 may be changed in order, repeated, omitted, or the like without departing from the disclosed concepts. Various embodiments of the flow 700 can be included in a computer program product embodied in a non-transitory computer readable medium that includes code executable by one or more processors.

Figure 8:
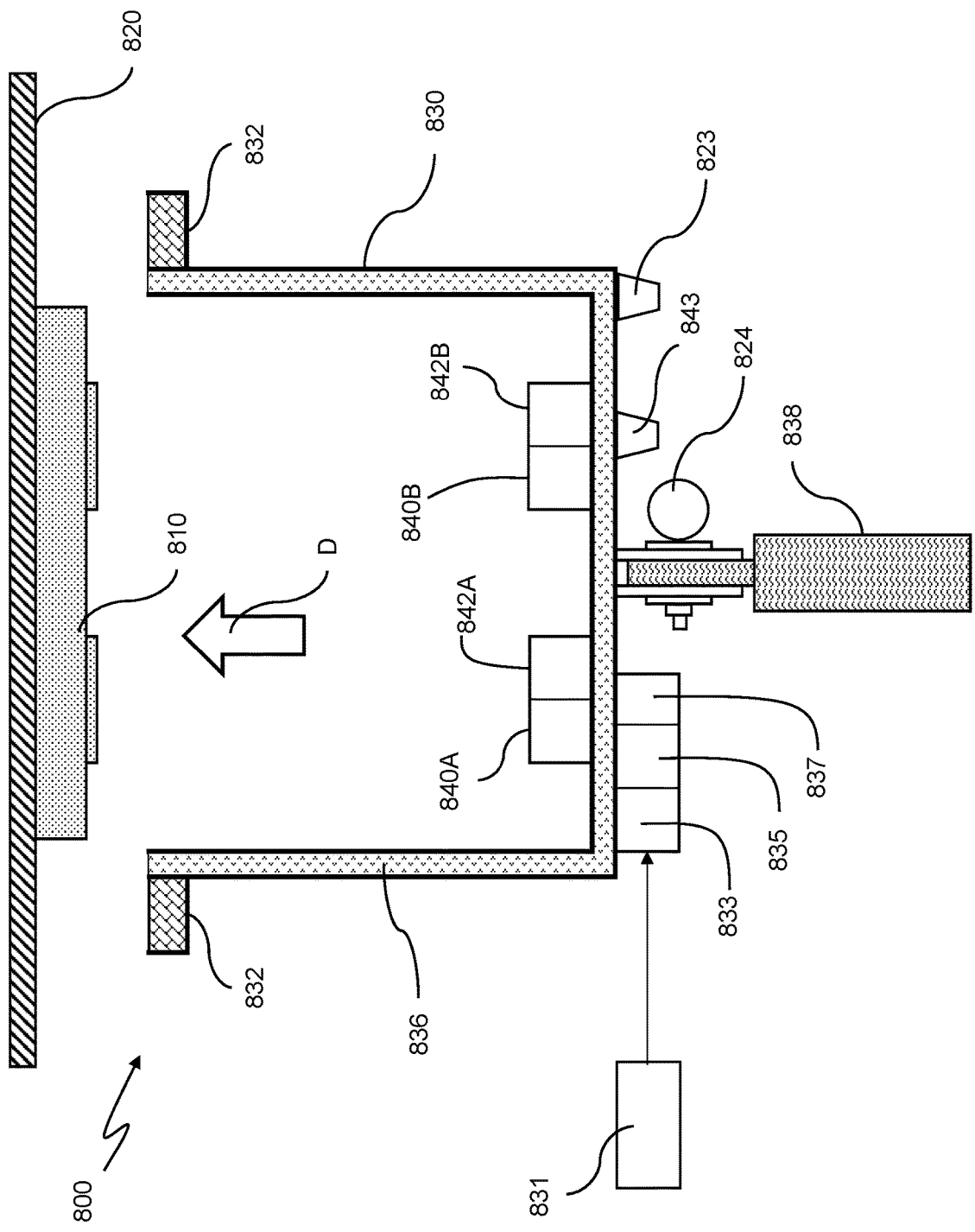
FIG. 8 is a diagram of a cross section of a gunshot sensor tester in accordance with alternative embodiments.

FIG. 8 is a diagram of a cross section of a gunshot sensor tester 800 in accordance with alternative embodiments. The gunshot sensor tester 800 comprises a housing 830 that houses two acoustic generators 840A and 840B. The gunshot sensor tester 800 further comprises two infrared generators 842A and 842B. Thus, each pair of acoustic and infrared generators is positioned on opposite halves of the housing.

The gunshot sensor tester (gunshot sensor evaluation device) further includes sound deadening material 836 within the housing 830 for audio isolation of the acoustic generators 840A and 840B from that region outside the housing. The gunshot sensor evaluation device further includes a gasket 832 on the housing that improves an audio seal around the gunshot sensor. The gunshot sensor evaluation device further includes a handle 838. The handle extends the housing 830 to an elevation for the gunshot sensor, allowing the gunshot sensor tester 800 to be placed over a gunshot sensor. The angle of the handle 838 with respect to the housing 830 can be adjusted via a thumbscrew 824. This allows the testing of gunshot sensors mounted on high walls, ceilings, and/or angled walls.

The gunshot sensor tester 800 further includes a trigger switch, or button 823. In embodiments, multiple trigger modes are possible. Embodiments include an instantaneous mode, where as soon as a user presses the button, the acoustic generators and/or infrared generators are activated to perform testing. In embodiments, one or more delay trigger modes are included. In some embodiments, there is a five second delay mode, where the acoustic generators and/or infrared generators are triggered five seconds after the operator (user) presses the button 823. In some embodiments, there is a ten second delay mode, where the acoustic generators and/or infrared generators are activated ten seconds after the user presses the button. Other delay durations are possible. In some embodiments, the delay is user-programmable. One or more of the modes can be asymmetric trigger modes. In one embodiment, the asymmetric trigger mode includes triggering only the acoustic generator 840A and/or the infrared generator 842A. In another embodiment, the asymmetric trigger mode includes triggering only the acoustic generator 840B and/or the infrared generator 842B. In another embodiment, the asymmetric trigger mode includes triggering the acoustic generator 840A and/or the infrared generator 842A, followed by a delay of a predetermined duration, followed by a triggering of the acoustic generator 840B and/or the infrared generator 842B. This allows stimulating of one side of the gunshot sensor 810 more than the other side, or performing directionality testing by simulating a delay as a pressure wave and/or sound wave passes by the gunshot sensor as a result of a firearm discharge. Thus, in embodiments, the acoustic generators and the housing 830 are configured to evaluate directionality of the gunshot sensor.

In use, the gunshot sensor tester 800 (the gunshot sensor evaluation device), is placed over a gunshot sensor 810 by moving it in the direction of arrow D such that the gasket 832 of the gunshot sensor evaluation device is flush against a wall 820 on which the gunshot sensor 810 is installed. Once in position, the acoustic generators 840A and 840B and/or the infrared generators 842A and 842B can be activated to cause the input of stimuli to the gunshot sensor 810. In embodiments, the gunshot sensor 810 is similar to the gunshot sensor 202 as shown in FIG. 2. In some embodiments, the infrared generators 842A and/or 842B are activated first, followed a by a delay, followed by the activation of the acoustic generators 840A and/or 840B.

The gunshot sensor tester 800 can further include an external switch jack 833. An external wired switch 831 can be connected via a wire or cable that connects into the external switch jack 833. In embodiments, the external switch jack is a ⅛ inch 3-contact phone jack. In some embodiments, the cable is a fifteen-foot cable. Other cable lengths are possible. The gunshot sensor tester 800 further includes a processor 835, and a memory 837 coupled to the processor. The memory contains instructions, that when executed by the processor 835, perform functions of disclosed embodiments. In some embodiments, the memory further includes stored audio samples such as pulse code modulation (PCM) data, or WAV files. In some embodiments, the audio data is stored in a lossless compression format, or a lossy compression format. The audio samples can be pulses, recordings of actual gunshots, recordings of simulated gunshots, or other audio samples that can be used for testing of a gunshot sensor.

The gunshot sensor tester 800 can include a battery level indicator 843. In embodiments, the battery level indicator 843 includes a light emitting diode (LED). In some embodiments, the LED is a multicolor LED. In such embodiments, the LED illuminates green for an operational battery level and illuminates red for a low-voltage battery condition. In embodiments, the gunshot sensor tester 800 comprises a battery for powering the acoustic generators and/or the infrared generators. In embodiments, the battery is a standard 9-volt battery cell.

Figure 9:
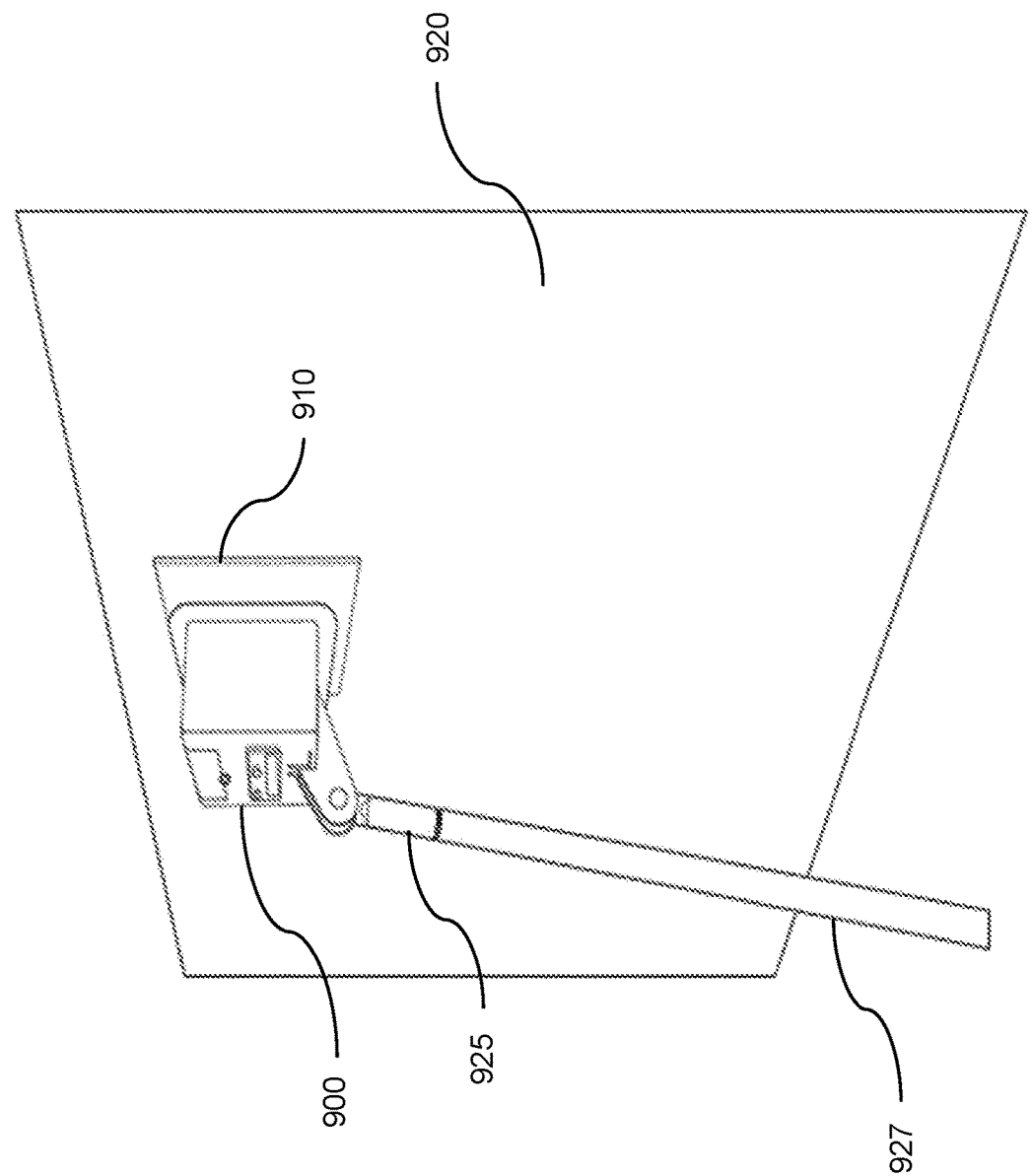
FIG. 9 illustrates use of a gunshot sensor tester with an extension on the handle.

FIG. 9 illustrates use of a gunshot sensor tester with an extension on the handle. Thus, the apparatus can include an extension handle. This embodiment is well suited for testing gunshot sensors mounted high on walls. As shown in FIG. 9, an extension 927 is connected to the handle 925, allowing the gunshot sensor tester 900 to be placed over a gunshot sensor 910 mounted on a wall 920. The gunshot sensor 910 can be mounted high on the wall 920, for example 6-20 feet, and can still be reached conveniently by gunshot sensor tester 900 using the handle 925 and the extension 927. In embodiments, the extension 927 has a threaded portion on a distal end to engage with a corresponding threaded cavity within the handle 925.

Figure 10:
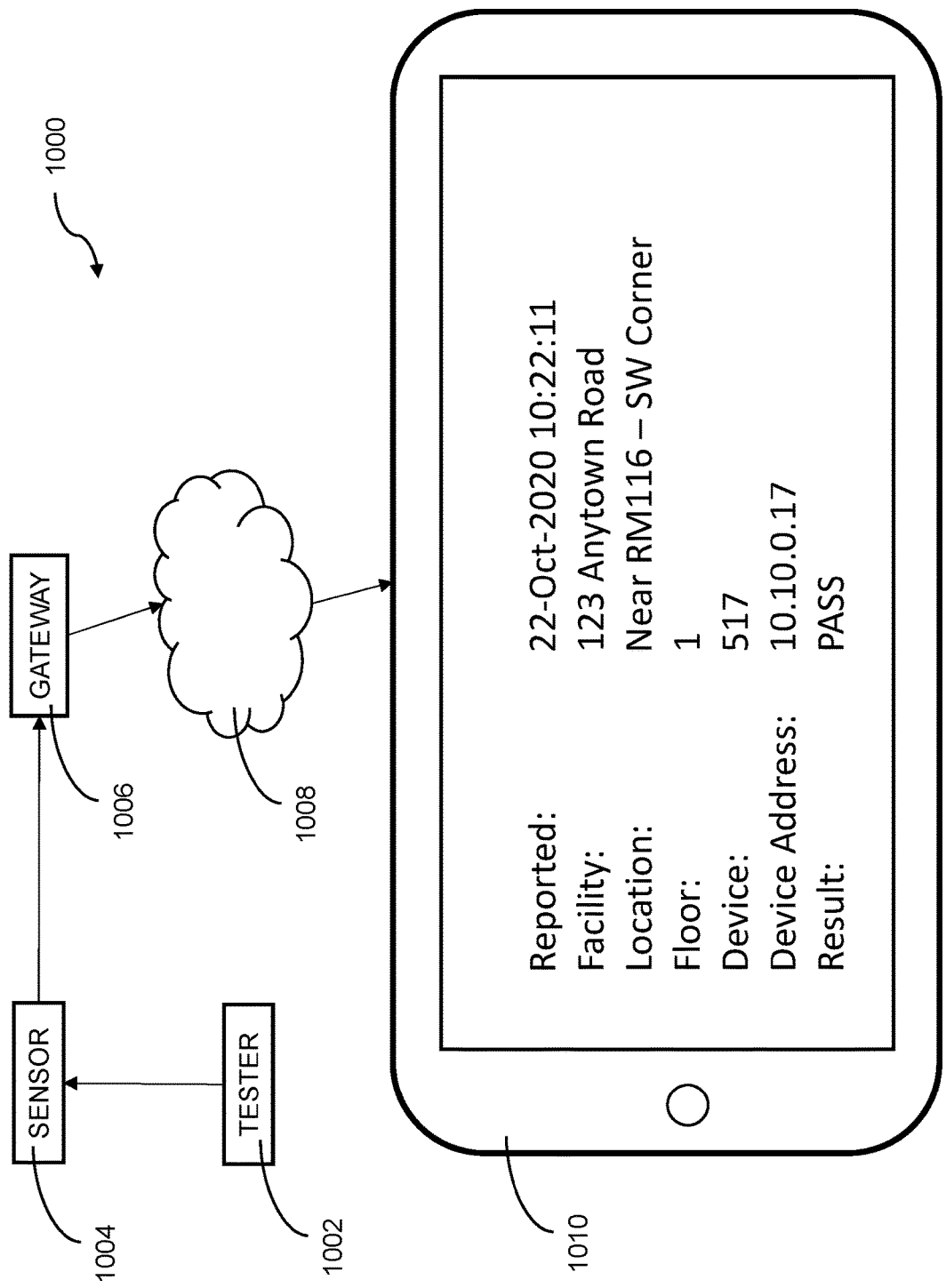
FIG. 10 is a diagram illustrating operator alerting.

FIG. 10 is a diagram illustrating operator alerting. The diagram 1000 includes a gunshot sensor tester 1002 that provides acoustic and/or infrared input to a gunshot sensor 1004. The gunshot sensor 1004 is in electronic communication with a gateway 1006. The gunshot sensor 1004 can send test data generated by the acoustic and/or infrared input of the gunshot sensor tester to the gateway 1006. The gateway 1006 can process the test data and derive a test result. The processing of the test data can include, but is not limited to, signal filtering, noise removal, peak detection, peak amplitude measurements, and/or detection of time between peaks. The test data can further include identifying data for the gunshot sensor such as a device identifier and/or device address. The test results can then be sent from the gateway 1006 to a mobile device 1010 via network 1008. In embodiments, network 1008 may include the Internet and/or a cellular data network. The test results can be enriched with additional metadata that is stored in the gateway, including, but not limited to, a date of the test, a facility, a location, and/or a floor. The test result of PASS or FAIL is also included. In embodiments, the data is sent from the gateway 1006 to the mobile device 1010 as a SMS text message, an e-mail, or other suitable format. In embodiments, the gateway 1006 acts as a server. Thus, in embodiments, the server communicates with a user to verify operation of the gunshot sensor with a text string to a mobile device. Furthermore, in embodiments, the text string includes a location and a device address of the gunshot sensor. In embodiments, the mobile device is a smartphone or tablet computer.

Figure 11:
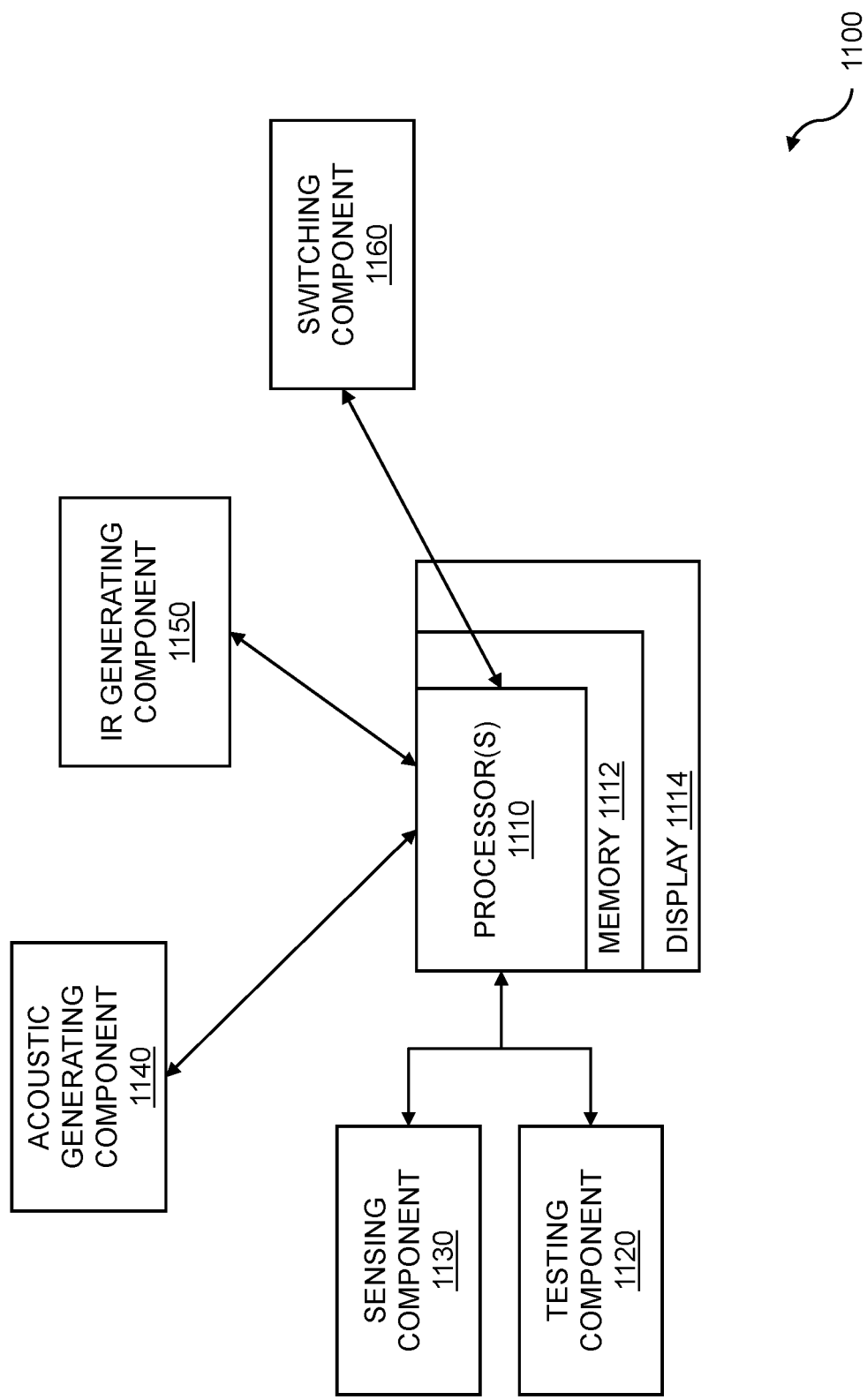
FIG. 11 is a system diagram for gunshot sensor evaluation.

FIG. 11 is a system diagram for gunshot sensor evaluation. The system 1100 can include one or more processors 1110 coupled to a memory 1112 which can store and retrieve instructions and data, and a display 1114. In embodiments, the gunshot sensor verifies its operation by communicating with a server, such as a gateway as indicated at 520 in FIG. 5. The system 1100 further includes a testing component 1120. The testing component 1120 can include stored patterns and/or waveforms for performing testing of gunshot sensors. The system 1100 can further comprise a sensing component 1130 which can include one or more acoustic and/or infrared sensors for confirming operation of the gunshot sensor tester device.

The system 1100 further includes an acoustic generating component 1140. In embodiments, the acoustic generating component includes one or more speakers, transducers, buzzers, piezoelectric devices, and/or other suitable sound generating devices. The system 1100 further includes an infrared generating component 1150. In embodiments, the infrared generating component 1150 comprises one or more infrared light emitting diodes. The infrared generating component 1150 can include a near-infrared generating light source and a mid-infrared generating light source. The system 1100 further includes a switching component 1160. The switching component 1160 can include one or more buttons and/or switches disposed on an exterior of the housing. Additionally, the switching component 1160 can include an external switch jack. The external switch jack allows connection of an external wired switch for activating the acoustic generating component 1140 and/or infrared generating component 1150. In some embodiments, the switching component 1160 includes a wireless interface. In this case, the switching can be activated via a wireless device, including, but not limited to, an infrared remote, a radio frequency remote, and/or an application from a mobile device such as a smartphone or tablet computer. The system can include a computer program product including code which causes one or more processors to perform operations of: using an acoustic generator in the testing of a gunshot sensor wherein the acoustic generator is connected to a housing wherein the housing covers the gunshot sensor; and detecting a switch activating the acoustic generator.

The system 1100 can enable a processor-implemented method for sensor evaluation comprising: activating an acoustic generator and an infrared generator for testing a gunshot sensor, wherein the acoustic generator and the infrared generator are encompassed in a housing, and wherein the housing covers the gunshot sensor; and stimulating the gunshot sensor to report a gunshot event, using the acoustic generator and the infrared generator. The method can include classifying the gunshot event as a test-mode gunshot. The method can include providing automatic notifications based on the gunshot event being classified as a test-mode gunshot. The automatic notifications can include digital radio notifications, email notifications, text message notifications, phone call notifications, website notifications, or voice mail notifications.

The system 1100 can enable a computer program product embodied in a non-transitory computer readable medium for sensor evaluation, the computer program product comprising code that causes one or more processors to perform operations of: activating an acoustic generator and an infrared generator for testing a gunshot sensor, wherein the acoustic generator and the infrared generator are encompassed in a housing, and wherein the housing covers the gunshot sensor; and stimulating the gunshot sensor to report a gunshot event, using the acoustic generator and the infrared generator. The system 1100 can provide a computer system for implementation of sensor evaluation comprising: a memory which stores instructions; one or more processors coupled to the memory, wherein the one or more processors, when executing the instructions which are stored, are configured to: activate an acoustic generator and an infrared generator for testing a gunshot sensor, wherein the acoustic generator and the infrared generator are encompassed in a housing, and wherein the housing covers the gunshot sensor; and stimulate the gunshot sensor to report a gunshot event, using the acoustic generator and the infrared generator.

Each of the above methods may be executed on one or more processors on one or more computer systems. Each of the above methods may be implemented on a semiconductor chip and programmed using special purpose logic, programmable logic, and so on. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. An apparatus for sensor evaluation comprising:
an acoustic generator used for testing a gunshot sensor;
an infrared generator used for testing the gunshot sensor, wherein the infrared generator and the acoustic generator are coupled to an activation circuit;
a housing encompassing the acoustic generator and the infrared generator, wherein the housing covers the gunshot sensor; and
a switch coupled to the acoustic generator and the infrared generator, wherein the switch provides activation control of the acoustic generator and the infrared generator.

2. The apparatus of claim 1 wherein the infrared generator comprises a light source operating in the near-infrared (NIR) band.

3. The apparatus of claim 2 wherein the light source operating in the NIR band provides testing for a gunshot muzzle flash sensor included in the gunshot sensor.

4. The apparatus of claim 2 further comprising a light source operating in the mid-infrared (MIR) band included in the infrared generator.

5. The apparatus of claim 4 wherein the light source operating in the MIR band provides testing for a passive infrared (PIR) sensor included in the gunshot sensor.

6. The apparatus of claim 4 wherein the light source operating in the MIR band provides testing for a motion detector included in the gunshot sensor.

7. The apparatus of claim 1 wherein the infrared generator provides a series of pulses.

8. The apparatus of claim 7 matches wherein the series of pulses matches a test mode setting for the gunshot sensor.

9. The apparatus of claim 1 wherein the acoustic generator provides a series of pulsed tones.

10. The apparatus of claim 1 wherein the acoustic generator emits a particular frequency.

11. The apparatus of claim 10 wherein the particular frequency matches a test mode setting for the gunshot sensor.

12. The apparatus of claim 1 wherein the housing that covers the gunshot sensor covers a faceplate for the gunshot sensor.

13. The apparatus of claim 12 wherein the housing that covers the gunshot sensor provides an acoustic perimeter seal between the housing and the gunshot sensor.

14. The apparatus of claim 13 further comprising a gasket on the housing that improves the acoustic perimeter seal.

15. The apparatus of claim 1 wherein the activation is a parallel activation of the acoustic generator and the infrared generator.

16. The apparatus of claim 1 wherein the activation is a sequential activation of the acoustic generator and the infrared generator.

17. The apparatus of claim 1 wherein the switch enables individual activation of the acoustic generator and the infrared generator.

18. The apparatus of claim 1 wherein activation of the acoustic generator is delayed from switch activation.

19. The apparatus of claim 1 wherein a triggering mode from a plurality of triggering modes is activated by switch activation control.

20. The apparatus of claim 1 further comprising sound deadening material within the housing for audio isolation of the acoustic generator from a region outside the housing.

21. The apparatus of claim 1 wherein the acoustic generator and the housing are configured to evaluate directionality of the gunshot sensor.

22. The apparatus of claim 1 wherein the infrared generator and the housing are configured to evaluate directionality of the gunshot sensor.

23. A processor-implemented method for sensor evaluation comprising:
activating an acoustic generator and an infrared generator for testing a gunshot sensor, wherein the acoustic generator and the infrared generator are encompassed in a housing, and wherein the housing covers the gunshot sensor; and
stimulating the gunshot sensor to report a gunshot event, using the acoustic generator and the infrared generator.

24. The method of claim 23 further comprising classifying the gunshot event as a test-mode gunshot.

25. The method of claim 24 further comprising providing automatic notifications based on the gunshot event being classified as a test-mode gunshot.

26. A computer system for implementation of sensor evaluation comprising:
a memory which stores instructions;
one or more processors coupled to the memory, wherein the one or more processors, when executing the instructions which are stored, are configured to:
activate an acoustic generator and an infrared generator for testing a gunshot sensor, wherein the acoustic generator and the infrared generator are encompassed in a housing, and wherein the housing covers the gunshot sensor; and
stimulate the gunshot sensor to report a gunshot event, using the acoustic generator and the infrared generator.

* * * * *